US012680886B2

(12) United States Patent
Hines et al.

(10) Patent No.: US 12,680,886 B2
(45) Date of Patent: Jul. 14, 2026

(54) REMOTE FLUID PROPERTIES DETECTION AND REPORTING

(71) Applicants: Scott M. Hines, Canton, MI (US); Kas Kasravi, West Bloomfield, MI (US)

(72) Inventors: Scott M. Hines, Canton, MI (US); Kas Kasravi, West Bloomfield, MI (US)

( * ) Notice: Subject to any disclaimer, the term of this patent is extended or adjusted under 35 U.S.C. 154(b) by 572 days.

(21) Appl. No.: 17/657,763

(22) Filed: Apr. 4, 2022

(65) Prior Publication Data

US 2024/0077367 A1 Mar. 7, 2024

Related U.S. Application Data

(60) Provisional application No. 63/173,419, filed on Apr. 10, 2021.

(51) Int. Cl.
*G01K 11/12* (2021.01)
*G01K 1/024* (2021.01)

(52) U.S. Cl.
CPC .............. *G01K 11/12* (2013.01); *G01K 1/024* (2013.01); *G01K 2215/00* (2013.01)

(58) Field of Classification Search
None
See application file for complete search history.

(56) References Cited

U.S. PATENT DOCUMENTS 2,648,226 A * 8/1953 Finch .......................... A61J 9/02
374/150
2,724,274 A * 11/1955 Rose ......................... G01K 5/00
374/E5.001

3,936,895 A * 2/1976 Talkington .............. B63B 22/20
441/21
5,553,941 A * 9/1996 Cope ......................... A61J 11/04
374/150
6,264,049 B1 7/2001 Shteynberg
10,006,897 B1 * 6/2018 Ensign ................... G01N 33/18
2004/0247015 A1 * 12/2004 Wojan .................... G01K 13/00
374/E1.018
2006/0191812 A1 * 8/2006 Oudekerk .............. B65D 25/20
206/459.1
2008/0251063 A1 * 10/2008 Palena .................... A47J 36/28
126/263.09
2020/0405403 A1 * 12/2020 Shelton, IV ....... A61B 17/3421

FOREIGN PATENT DOCUMENTS

CN 106806151 B1 11/2015
DE 19909577 B1 3/1999
DE 10032770 B1 7/2000

* cited by examiner

*Primary Examiner* — Eric S. McCall
*Assistant Examiner* — Nigel H Plumb

(57) ABSTRACT

A device for remote detection and reporting of fluid properties. A float has a sensor array for detecting the temperature of a fluid and visually transmitting the temperature to a user. The float has at least one side arm and at least one lower arm for detection of fluid properties, where the lower arm has a ballast and a gas bladder for orienting and stabilizing the float. The float, the side arms, and the lower arm are made of a thermally conductive plastic and coated with a thermochromic compound optimized for visually reporting the temperature of a fluid via change in color. The device enables the user to remotely and visually obtain the temperature of a fluid in a closed container.

6 Claims, 4 Drawing Sheets

100

110

105

115

A

A

210

205

205

215

220

225

235

230

Section A-A

337

305

REMOTE FLUID PROPERTIES DETECTION AND REPORTING

CROSS-REFERENCE TO RELATED APPLICATIONS

This application claims the benefit of U.S. Provisional Application No. 63/173,419, filed Apr. 10, 2021. The content of U.S. Provisional Application 63/173,419 is incorporated herein by reference for all purposes.

BACKGROUND OF THE INVENTION

The present invention relates generally to sensing physical properties and in particular to remotely detecting properties of fluids in containers.

Currently there are a number of solutions for detecting properties of fluids in containers. Some of these solutions attach a sensor to the container to measure a property such as temperature, but these solutions fail to meet the needs of the industry because the sensors are influence by the ambient condition and fail to report the actual properties within the fluid. Other solutions attach sensors inside containers, but these solutions are similarly unable to meet the needs of the industry as they measure the fluid properties at specific locations and not representative of the overall fluid properties, further, these solutions require wiring to transmit the information associated with fluid properties, which impose physical limitations to the utility of the solutions. Still further, other solutions attempt to insert probes into the fluid, which also don't meet the needs of the industry due to high maintenance requirements.

It would be desirable to have a device capable of remotely detecting and reporting properties of fluids in a container, where such properties include temperature, density, impurity, colloidal particles, viscosity, color, gas content, and chemical composition. Furthermore, it would also be desirable to have a device that easily reports the said properties to a user outside the container. Still further, it would be desirable to have a device that reports the fluid properties without physical wiring or connections. It would also be desirable to have a device that is easy to use/maintain and not require a complex installation process or physical attachments. Even further, it would be desirable to have a device that controllably floats over or within the fluid.

SUMMARY OF THE INVENTION

The present invention advantageously fills the aforementioned deficiencies by providing a device for remote detection and reporting of fluid properties, which accurately detects the fluid properties and does not require a complex installation process.

The present invention is a device for remote detection and reporting of fluid properties, which is made up of the following components: a float located within the fluid, a sensor for detecting the temperature of the fluid, a transmitter for reporting the detected temperature, a ballast and/or a gas bladder for controlling the buoyancy of the device within the fluid.

These components are related to each other as follows: the float contains the sensor array, the transmitter, the ballast, and the gas bladder. The sensor detects the fluid temperature and communicates a user in a contact-less fashion.

The present invention may also have one or more of the following: at least one side arm attaching at one end to the float and projecting away from the float that helps orient and stabilize the float over or within the fluid, and at least one lower arm attached to the bottom of the float at one end and projecting downward from the float to help detect fluid properties and stabilize the float over or within the fluid. The lower arm contains the ballast at the end not attached to the float. The float and the said arms optionally contain an embedded gas bladder. The float, the side arms, and the lower arm are made of a thermally conductive material core, preferably a thermally conductive plastic capable of sensing and propagating the fluid temperature. The entire float, the side arms, the lower arms, and the ballast are coated with a thermochromic compound that is in direct contact with the thermally conductive core, preferably thermochromic silicone calibrated to visually transmit the temperature of the fluid as detected by the float. This embodiment is configured for detecting the milk temperature in a baby milk bottle and visually displaying the milk temperature to the user via the color of the thermochromic coating.

The present invention is unique when compared with other known devices and solutions because the present invention provides: (1) a float, (2) side arms, (3) a lower arm, (4) a ballast, (5) a gas bladder, (6) thermally conductive core, and (7) thermochromic coating, collectively referred to as a float assembly.

The present invention is unique in that it is structurally different from other known devices or solutions. More specifically, the present invention is unique due to the presence of: (1) a float with a thermally conductive material to detect temperature, (2) thermochromic coating to visually communicate temperature, and (3) a combination of ballast and a gas bladder to control the buoyancy of the device within a fluid.

Among other things, it is an objective of the present invention to provide a remote fluid property detection and reporting that does not suffer from any of the problems or deficiencies associated with prior solutions.

It is an objective of the present invention to accurately detect the properties of a fluid stored in a container and remotely report the fluid properties to a user. It is further an objective of the present invention to create a device that is safe and easy to use. Still further, it is an objective of the present invention to float within the fluid to obtain actual readings of the fluid and not influenced by ambient conditions.

The present invention now will be described more fully hereinafter with reference to the accompanying drawings, which are intended to be read in conjunction with both this summary, the detailed description, and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
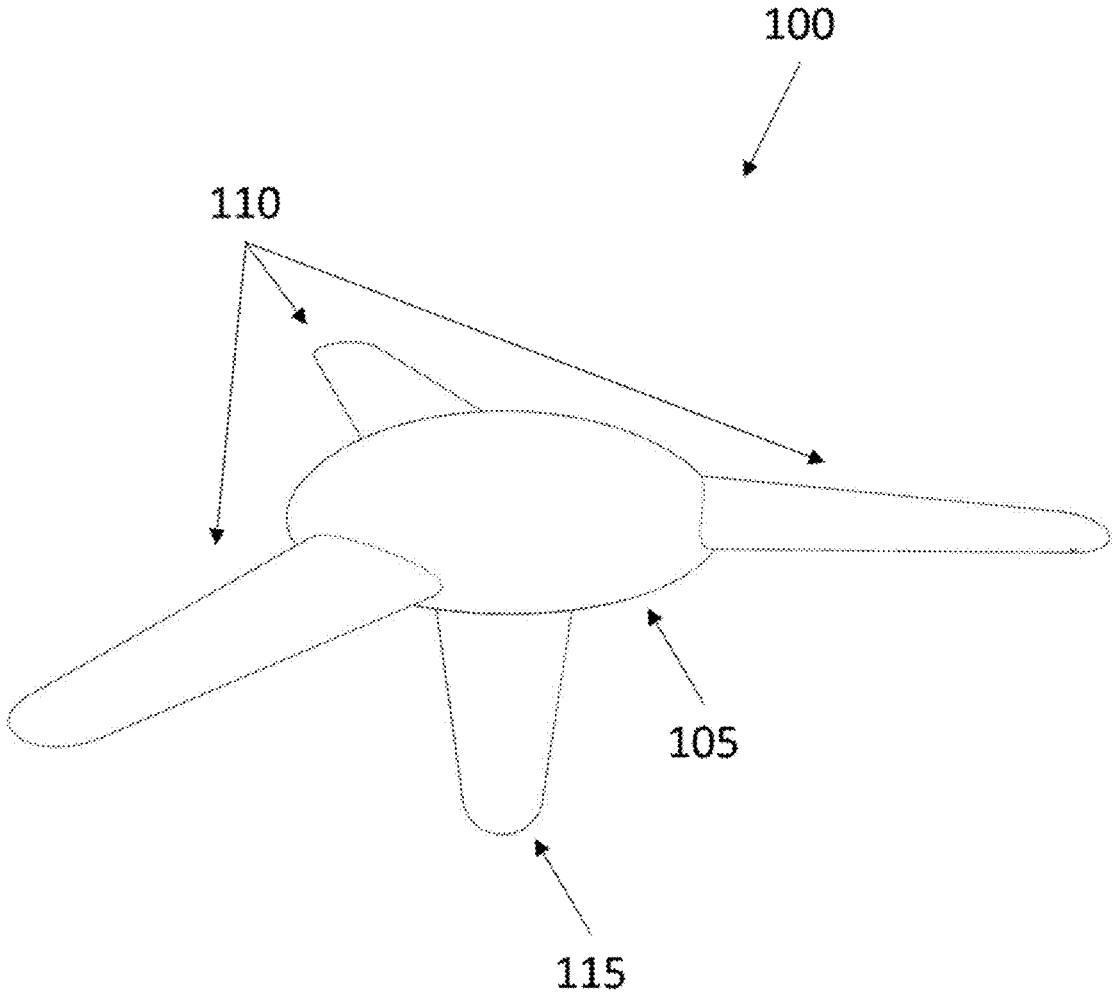
FIG. 1 shows a perspective view of the remote fluid properties detection device.

The present invention is directed to a device for remote fluid properties detection and reporting. The present invention comprises a float placed in a fluid whose properties are desired by a user. The float has a sensor fabricated to measure the temperature of the fluid. The float has a transmitter fabricated to visually convey the temperature to the user. Further, the float has a ballast and a gas bladder to control the buoyancy and stabilization of the present invention in fluids. The present invention is now described in detail with reference to the attached figures.

The figures herein follow a numbering convention in which the first digit or digits correspond to the drawing figure number and the remaining digits identify an element or component in the drawing. Similar elements or components between different figures may be identified using similar digits. For example, 145 may reference element "45" in FIG. 1, and a similar element may be referenced as 245 in FIG. 2. Elements shown in the various figures herein can be added, exchanged, and/or eliminated to provide a number of additional examples of the present disclosure. In addition, the proportion and the relative scale of the elements provided in the figures are intended to illustrate the examples of the present disclosure and should not be taken in a limiting sense.

Figure 2A:
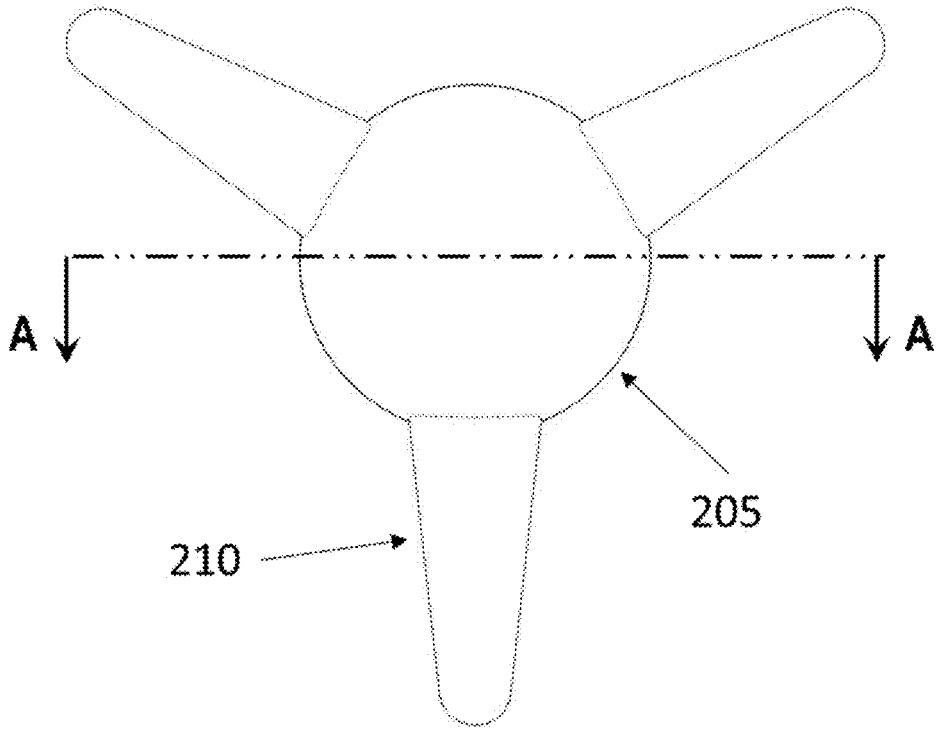
FIG. 2A shows the top view of the remote fluid properties detection device.

FIG. 1 shows a perspective view of a device for remote fluid properties detection and reporting 100 having a float 105, at least one side arm 110, and a lower arm 115. FIG. 2A shows the top view of the present invention with the float 205 and at least one side arm 210. These elements are collectively referred to a float assembly. This embodiment of the present invention is presented with three side arms to assist with floatation of the float in fluids. Section A-A is identified and referenced in FIG. 2B.

Figure 2B:
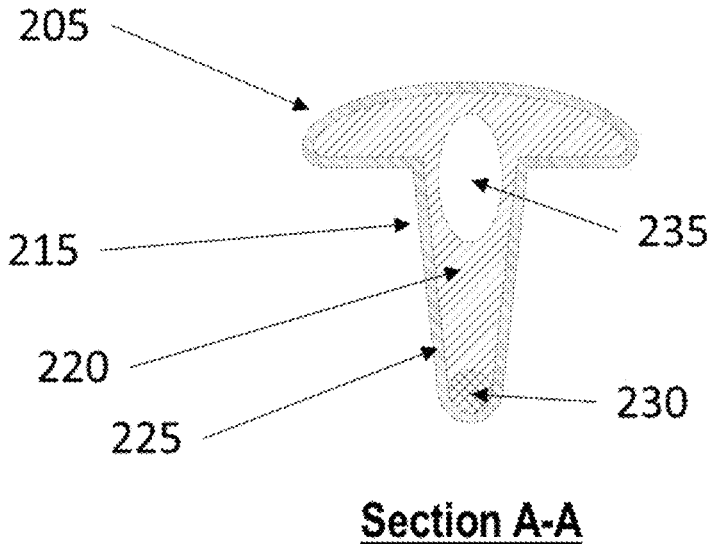
FIG. 2B shows a cross section of the remote fluid properties detection device.

FIG. 2B shows the front view of the section A-A, where the internal structure of the float 205 is illustrates in greater detail. The float 205 comprises the lower arm 215, a core 220, a coating 225, a ballast 230, and a gas bladder 235. The aforementioned float, side arms, and the lower arm are integrated and jointly make up the core 220. The core 220 is made of a thermally conductive material, preferably a thermally conductive plastic. The thermally conductive plastic used in the core 220 is preferably flexible. The coating 225 is made of a thermochromic compound, preferably a thermochromic silicone, where the thermochromic silicone is optionally food grade. A person having ordinary skill in the art would recognize that the thermochromic compound is available in powder, liquid, and other forms. Further, a person having ordinary skill in the art would recognize that the thermochromic compound may be embedded within a subject material, such as the coating 225, or coated under it. The ballast 230 is a dense material integrated within the end of the lower arm 215 away from the float 205 to help orient and stabilize the float 205 in fluids. The gas bladder 235 is filled with a gas, such as air, to help control the buoyancy of the float 205 in fluids. The combination of the ballast 230 and the gas bladder 235 are configured to control buoyancy, orientation, and stabilization of the float 205 in fluids. A person having ordinary skill in the art would recognize that the choice of the materials for the core 220 and the ballast 230, along with the dimensions and location of the gas bladder 235 would result in controlling the floatation location of the float 205 in fluids in a desired manner, in particular whether the float 205 floats on top of fluids, suspended within fluids, or sinks to the bottom of fluids. The floatation location increases the accuracy of the detected properties depending on the nature of the fluid and the desired properties.

The embodiment of the present invention shown in FIGS. 1, 2A, and 2B floats in fluids and the temperature of thermally conductive core 220 complies with the fluid temperature. The thermochromic coating 225 responds to the temperature of the core 220 by changing color, which is propagated across the entire float 205, the side arms 210 and the lower arm 215. A person having ordinary skill in the art would recognize that the thermochromic coating 225 can be fabricated to present specific colors and specific temperatures according to the intended use case. Thus, shortly after placing the float assembly in a desired fluid, the color of the float 205 changes, which visually transmits the fluid temperature to the user.

With reference to FIG. 1, in one embodiment the float 105, three side arms 110, and lower arm 115 have dimensions to fit a standard baby milk bottle. In this embodiment, the dimensions of the float assembly are such that the float assembly is larger than the opening of a milk bottle, requiring pushing and flexing the side arms to 110 to insert the float assembly into a milk bottle. Thus, the float assembly is entrapped in the bottle and does not accidentally exit the bottle in the absence of a deliberate action by the user. The user is subsequently informed about the milk temperature that is optimal for a baby.

Figure 3:
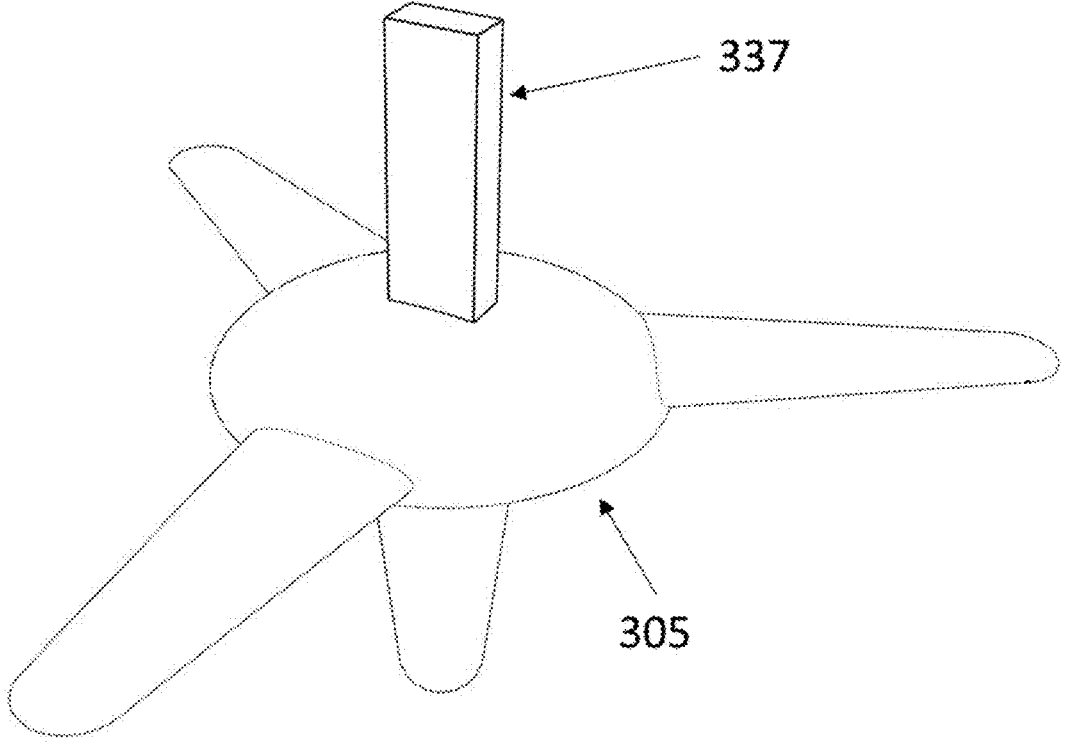
FIG. 3 shows a perspective view of the remote fluid properties detection device with an extraction arm.

FIG. 3 shows an extraction arm 337 attached to the top of the float 305. The extraction arm 337 facilitates the removal of the float 305 from a container, such as a milk bottle. The extraction arm 337 is configured to allow the user to grab the top of the extraction arm 337 by normal means, pull it up, and remove the float assembly from the container.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A remote fluid properties detector comprising:
a float where in the float is located within a fluid;
the float is composed of a thermally conductive material coated with a thermochromic compound;
the thermochromic compound is fashioned to display a specific color at a target temperature where the thermochromic compound solely operates via a chemical reaction;
the thermally conductive material assumes and retains the temperature of the fluid;
the thermally conductive material transfers the fluid temperature to the thermochromic compound;
the thermochromic compound is the transmitter and provides a visual indication of the fluid temperature via the specific color;
at least one of a ballast and a gas bladder within the float fashioned to orient the float within the fluid and control the float's orientation and buoyancy; and the float is configured to fit within a baby milk bottle and transmit the target temperature of fluid via a specific color.

2. The remote fluid properties detector of claim 1, wherein the float has at least one side arm and at least one lower arm.

3. The remote fluid properties detector of claim 2, wherein the thermally conductive material is a thermally conductive plastic.

4. The remote fluid properties detector of claim 3, wherein the thermally conductive plastic is flexible.

5. The remote fluid properties detector of claim 4, wherein the thermally conductive material and the thermochromic compound are food safe.

6. The remote fluid properties detector of claim 5, wherein the float has at least one extraction arm attached to the top of the float.

* * * * *